United States Patent
Cai et al.

(10) Patent No.: US 9,973,901 B2
(45) Date of Patent: May 15, 2018

(54) ENHANCING GROUP COMMUNICATION SERVICES

(71) Applicant: BlackBerry Limited, Waterloo (CA)

(72) Inventors: Zhijun Cai, Herndon, VA (US);
Chandra Sekhar Bontu, Nepean (CA);
Yi Song, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 241 days.

(21) Appl. No.: 14/229,324

(22) Filed: Mar. 28, 2014

(65) Prior Publication Data
US 2015/0281912 A1    Oct. 1, 2015

(51) Int. Cl.
| H04W 4/06 | (2009.01) |
| H04L 1/18 | (2006.01) |
| H04L 5/00 | (2006.01) |
| H04L 1/00 | (2006.01) |
| H04W 4/10 | (2009.01) |
| H04W 72/12 | (2009.01) |

(52) U.S. Cl.
CPC ............ *H04W 4/06* (2013.01); *H04L 1/0026* (2013.01); *H04L 1/1812* (2013.01); *H04L 5/0053* (2013.01); *H04L 2001/0093* (2013.01); *H04W 4/10* (2013.01); *H04W 72/121* (2013.01)

(58) Field of Classification Search
CPC ..... H04W 72/04; H04W 88/08; H04W 72/00; H04L 1/18; H04L 4/08; H04L 4/10
See application file for complete search history.

(56) References Cited

U.S. PATENT DOCUMENTS

| 8,204,010 B2 | 6/2012 | Suzuki et al. |
| 8,537,862 B2* | 9/2013 | Blankenship ......... H04L 5/0053 370/252 |
| 2007/0153727 A1 | 7/2007 | McBeath et al. |
| 2007/0230412 A1 | 10/2007 | McBeath et al. |
| 2007/0274288 A1 | 11/2007 | Smith et al. |
| 2008/0025247 A1 | 1/2008 | McBeath et al. |
| 2008/0025337 A1 | 1/2008 | Smith et al. |

(Continued)

OTHER PUBLICATIONS

3GPP TSG RAN WG1 Meeting #74, R1-133187, Reusing Single Cell MBMS for D2D Group Communication, Barcelona, Spain, Aug. 9, 2013, XP050716018, 4 pages.

(Continued)

*Primary Examiner* — Ian N Moore
*Assistant Examiner* — Phong La
(74) *Attorney, Agent, or Firm* — Fish & Richardson P.C.

(57) ABSTRACT

In some implementations, a method in a user equipment (UE) for supporting group communication service includes receiving, from a base station, a group communication on a Physical Downlink Shared Channel (PDSCH). The UE determines a first Hybrid Automatic Repeat reQuest (HARQ) information that corresponds to the group communication on the PDSCH. The UE transmits the first HARQ information. In some implementations, the UE determines a group Channel State Information (CSI) for a group communication that is transmitted by a base station on a PDSCH. The UE determines a unicast CSI for a unicast communication that is transmitted by the base station on the PDSCH. The UE transmits the group CSI. The UE transmits the unicast CSI.

4 Claims, 4 Drawing Sheets

(56) References Cited

U.S. PATENT DOCUMENTS

| | | | |
|---|---|---|---|
| 2008/0037496 A1 | 2/2008 | Smith et al. | |
| 2008/0062936 A1 | 3/2008 | He et al. | |
| 2008/0062944 A1 | 3/2008 | Smith et al. | |
| 2008/0101281 A1 | 5/2008 | Harris et al. | |
| 2008/0310363 A1 | 12/2008 | McBeath et al. | |
| 2009/0042581 A1 | 2/2009 | Liu et al. | |
| 2009/0109914 A1 | 4/2009 | McBeath et al. | |
| 2009/0149188 A1 | 6/2009 | McBeath et al. | |
| 2010/0296454 A1* | 11/2010 | Park | H04L 1/1812 370/328 |
| 2010/0303013 A1* | 12/2010 | Khandekar | H04W 99/00 370/328 |
| 2011/0154421 A1* | 6/2011 | Chun | H04N 21/2385 725/109 |
| 2011/0249620 A1* | 10/2011 | Yu | H04B 7/022 370/328 |
| 2011/0268080 A1* | 11/2011 | Luo | H04L 5/0053 370/330 |
| 2011/0275363 A1* | 11/2011 | Kwon | H04W 48/18 455/422.1 |
| 2011/0305197 A1* | 12/2011 | Park | H04L 1/1812 370/328 |
| 2012/0120842 A1* | 5/2012 | Kim | H04B 7/024 370/252 |
| 2012/0207092 A1* | 8/2012 | Zirwas | H04L 5/0073 370/328 |
| 2012/0302240 A1* | 11/2012 | Tamaki | H04W 36/0011 455/436 |
| 2012/0307781 A1* | 12/2012 | Enomoto | H04L 1/1861 370/329 |
| 2013/0294333 A1* | 11/2013 | Chen | H04L 5/0048 370/328 |
| 2014/0003320 A1* | 1/2014 | Etemad | H04W 4/06 370/312 |
| 2014/0044040 A1* | 2/2014 | Chen | H04W 24/02 370/328 |
| 2014/0056278 A1* | 2/2014 | Marinier | H04W 72/044 370/330 |
| 2014/0198677 A1* | 7/2014 | Xu | H04L 1/0026 370/252 |
| 2014/0274030 A1* | 9/2014 | Aminzadeh | H04W 76/027 455/424 |
| 2014/0293893 A1* | 10/2014 | Papasakellariou | H04W 72/04 370/329 |
| 2015/0098441 A1* | 4/2015 | Peng | H04W 72/042 370/330 |
| 2015/0195822 A1* | 7/2015 | Han | H04W 52/0258 370/329 |
| 2015/0201383 A1* | 7/2015 | Papasakellariou | H04W 52/146 370/278 |

OTHER PUBLICATIONS

International Search Report and Written Opinion in International Application No. PCT/US2015/023059, dated Jun. 24, 2015, 13 pages.

"3GPP TS 22.468 V12.0.0; 3rd Generation Partnership Project;Technical Specification Group Services and System Aspects;Group Communication System Enablers for LTE (GCSE_LTE)(Release 12); Jun. 2013".

"3GPP TS 36.331 V12.0.0; 3rd Generation Partnership Project;Technical Specification Group Radio Access Network; Evolved Universal Terrestrial Radio Access (E-UTRA);Radio Resource Control (RRC); Protocol specification(Release 12); Dec. 2013".

* cited by examiner

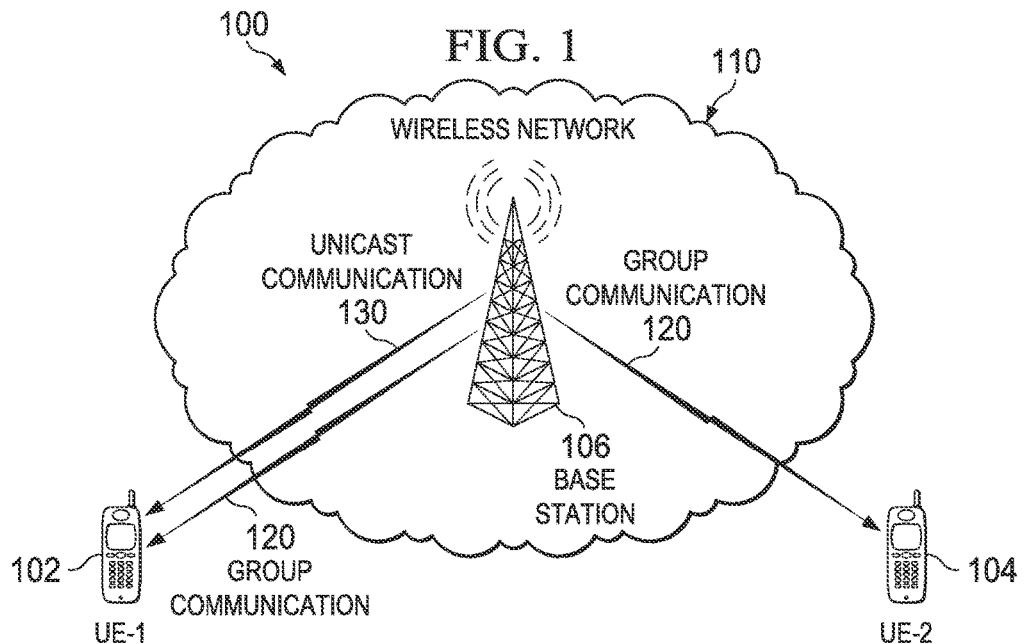
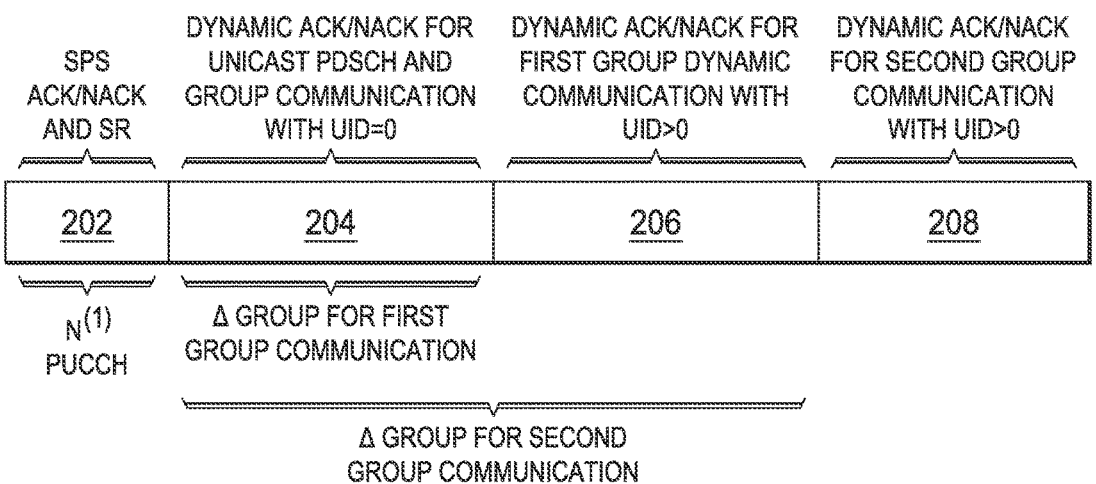

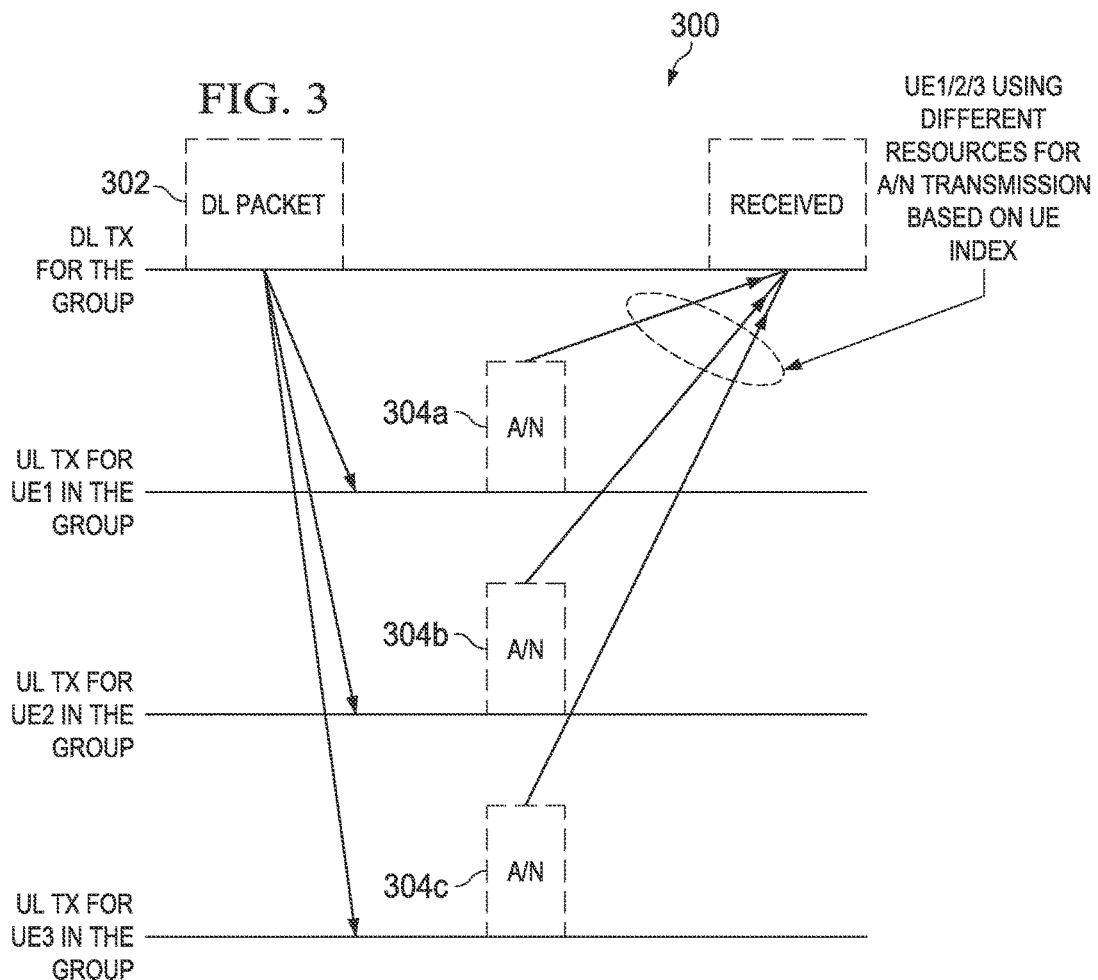
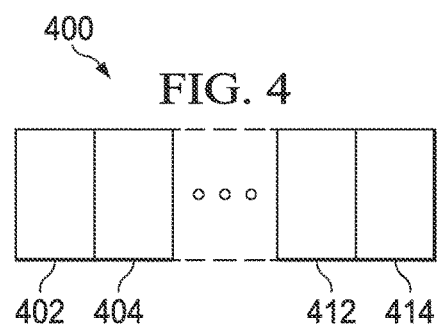

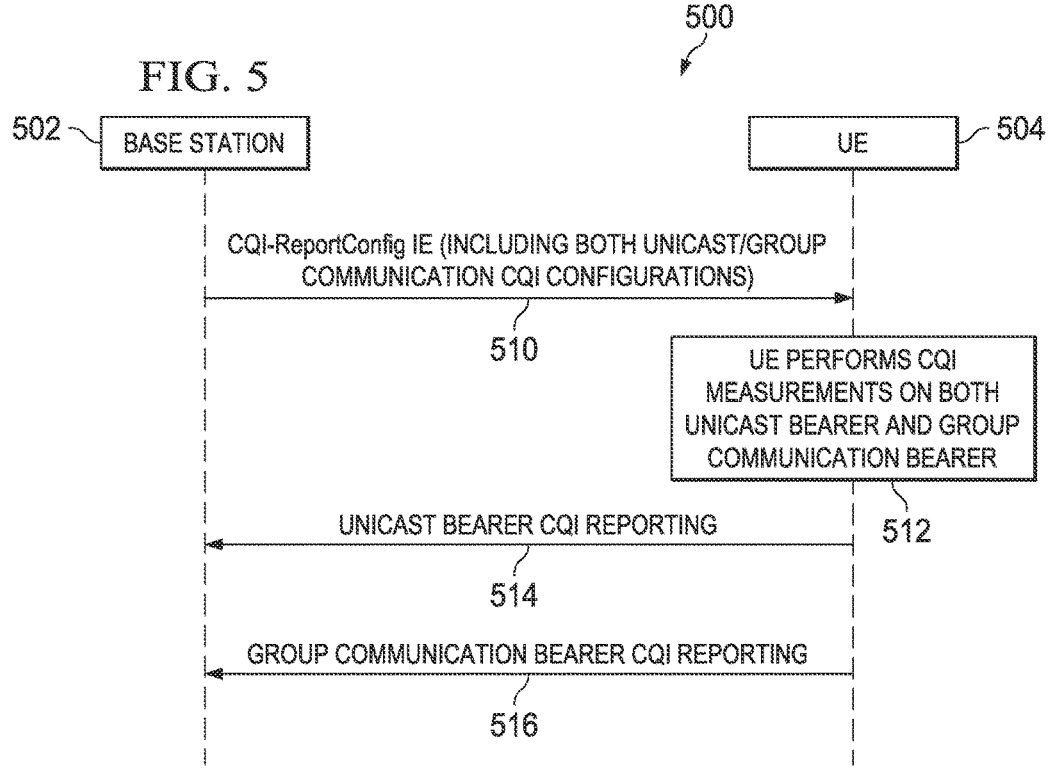

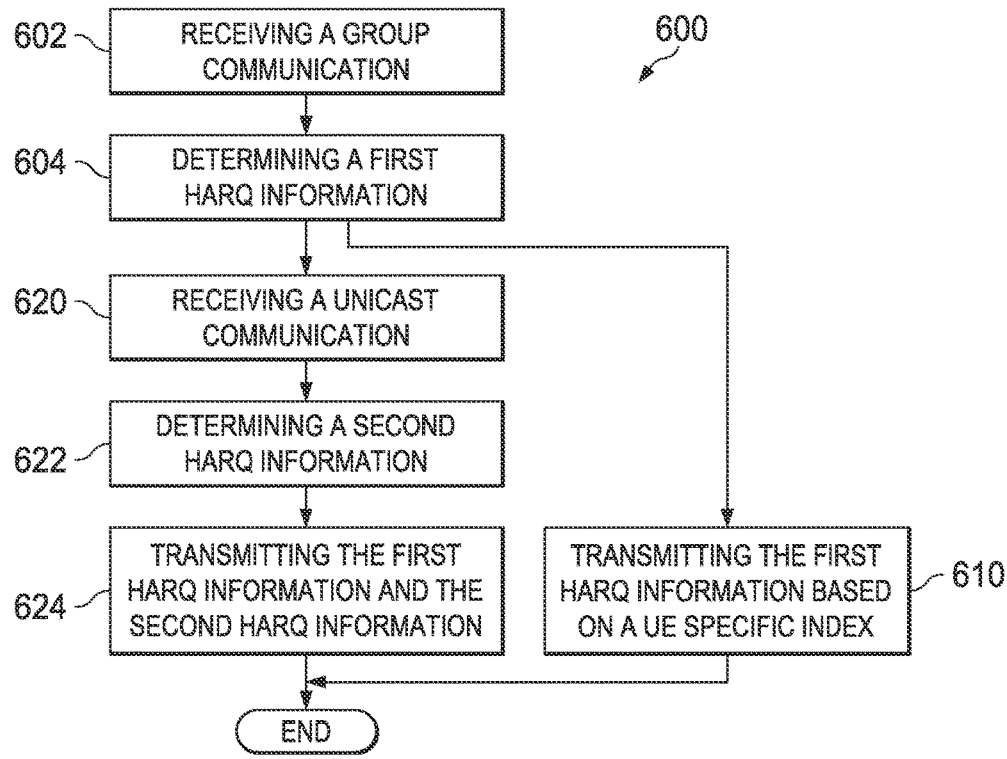
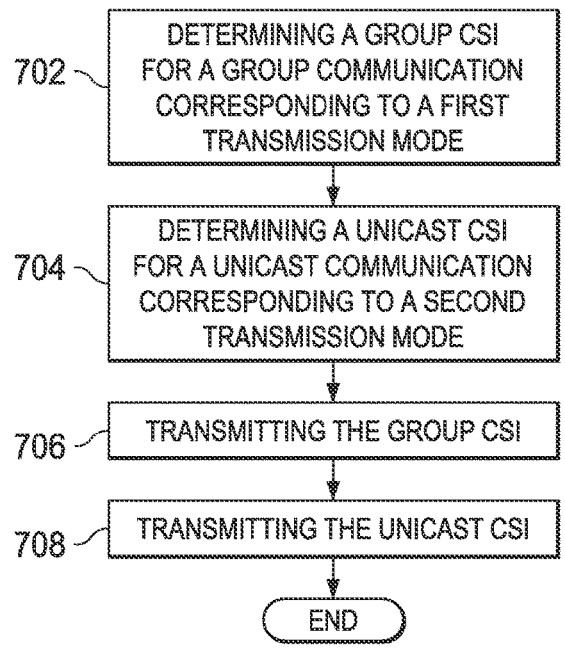

US 9,973,901 B2

ENHANCING GROUP COMMUNICATION SERVICES

TECHNICAL FIELD

This disclosure relates to data transmission in communication systems and, more specifically, to enhancing group communication services.

BACKGROUND

A wireless communication system, such as a third generation partnership project (3GPP) long term evolution (LTE) system, may provide a unicast communication service to a User Equipment (UE). In a unicast communication service, a base station transmits one data packet to a single User Equipment (UE). Alternatively or in combination, a wireless communication system may provide a group communication service to multiple UEs. In a group communication service, a base station transmits the same data packet to a group of UEs. For example, the group communication service can provide a Push to Talk (PTT) functionality. In a PTT service, one user in a group may push a button to transmit a communication, and other users in the group may receive the same communication simultaneously.

A wireless communication system may provide flexible modes of operation for a group communication service as the users and the environment they are operating in evolves. For example, an LTE or LTE_Advanced system supports broadband communication and, therefore, may support voice, video or, more general, data communication for a group communication service. Furthermore, an LTE or LTE_Advanced system can support users communicating with several groups at the same time in parallel. For example, the system may transmit a voice communication from a user to one group, and transmit a stream of video communication from the user to several other groups.

DECRIPTION OF DRAWINGS

FIG. 1 is an example mobile communication system supporting group communication services.

FIG. 2 is an example PUCCH resource configuration for a group communication service.

FIG. 3 is a schematic illustrating an example transmission of HARQ information for a group communication service.

FIG. 4 is an example PUCCH payload.

FIG. 5 is a schematic illustrating an example transmission of a Channel State Information (CSI) for a group communication service.

FIG. 6 is a flowchart illustrating a method for transmitting HARQ information for a group communication service.

FIG. 7 is a flowchart illustrating a method for transmitting a CSI for a group communication service.

DETAILED DESCRIPTION

The present disclosure is directed to enhancing group communication services. In a group communication service, the users are organized into groups. A user may be a member of more than one group. The system may define the UEs that may join a group. The system may also define an operating area of the group. In some implementations, the system defines the operating area of the group based on a list of base stations that support the group. The system may also allocate resources for a group communication service. For example, base stations that provide service to a large number of group members may use the same resources for all the group members to receive the call. For example, if a member UE moves into the operating area of the group, the system may automatically add the member UE to the group. If a member UE moves out of the operating area, the system may automatically remove the member UE from the group.

In wireless communication systems, such as LTE systems, a UE may transmit a Hybrid Automatic Repeat reQuest (HARQ) information in response to a unicast communication that the UE received on a Physical Downlink Shared Channel (PDSCH). A HARQ information may be an acknowledgement (ACK), which signals successful receipt of data. HARQ information may also be a negative acknowledgement (NACK), which signals that data was not received successfully. A UE may transmit HARQ information on a Physical Uplink Control Channel (PUCCH) or a Physical Uplink Shared Channel (PUSCH).

FIG. 1 is an example mobile communication system 100 that supports group communication services. For example, in a mobile communication system, a UE may receive a group communication on a PDSCH from a base station. The base station may be a NodeB, an evolved NodeB (eNB), or an access point. The UE may determine first HARQ information that corresponds to the group communication on the PDSCH. The UE may transmit the first HARQ information. In some implementations, the UE may transmit the first HARQ information based on a UE specific index. In some implementations, the UE may transmit the first HARQ information based on both the UE specific index and a Downlink (DL) grant that is associated with the group communication on the PDSCH. In some implementations, the UE may receive an indication of the UE specific index in a Radio Resource Control (RRC) message. Indicating the UE specific index in a RRC message may enable the base station to allocate resources flexibly. Alternatively or in combination, the UE may derive the UE specific index based on an identity that is associated with the UE. The identity may be a Radio Network Temporary Identity (RNTI), a Temporary Mobile Subscriber Identity (TMSI), or an International Mobile Subscriber Identity (IMSI). Deriving the UE specific index based on a UE identity may reduce signaling overhead between the UE and the base station. This approach may reduce latency and save system resources.

In some implementations, the UE may also receive a unicast communication on the PDSCH from the base station. The UE may determine second HARQ information that corresponds to the unicast communication on the PDSCH. The UE may transmit the second HARQ information. In some implementations, the UE may transmit the first HARQ information and the second HARQ information together. For example, the UE may use Physical Uplink Control Channel (PUCCH) format 3 to transmit the first HARQ information and the second HARQ information. In some implementations, the UE may transmit the first HARQ information based on a DL grant that is associated with the unicast communication on the PDSCH. In some implementations, the UE may transmit the first HARQ information and the second HARQ information on a PUCCH resource that is configured by a RRC message.

In some implementations, a UE may determine a group Channel State Information (CSI) for a group communication that is transmitted by a base station on a PDSCH. The UE may also determine a unicast CSI for a unicast communication that is transmitted by the base station on the PDSCH. In some implementations, the group CSI corresponds to a first transmission mode and the unicast CSI corresponds to a second transmission mode. In some implementations, the first transmission mode is different than the second transmission mode. The group CSI may include one or more Channel Quality Indicators (CQIs), one of more Precoding Matrix Indicators (PMIs), one or more Precoding Type Indicators (PTIs), and/or one or more Rank Indicators (RIs). The UE may transmit the group CSI and the unicast CSI. In some implementations, the UE may transmit the group CSI on a PUCCH resource that is configured by a RRC message.

Transmitting HARQ information and CSI according to methods and systems described herein may provide one or more advantages. For example, transmitting HARQ information corresponding to a group communication may improve the efficient use of system resources. For example, the base station may receive feedback on the reception of the group communication from the UEs in a group. If all the UEs in a group have correctly received the group communication, they may transmit ACKs and consequently, the base station may terminate the HARQ process and save retransmission resources. If one or more UEs in the group have not correctly received the group communication, they may transmit NACKs to request further retransmissions.

Furthermore, transmitting CSI for group communication may reduce the error rate and the latency of the group communication service. For example, the base station may determine an optimal transmission format of a group communication based on the CSIs transmitted by the UEs in a group. This approach may also improve the efficient use of system resources.

At a high level, the example mobile communication system 100 includes a UE-1 102, a UE-2 104, and a wireless network 110, which includes a base station 106 that is communicably coupled with the UE-1 102 and the UE-2 104. In the illustrated example, the UE-1 102 and the UE-2 104 are members of the same group in a group communication service. In some instances, the UE-1 102 and the UE-2 104 may receive a group communication 120 from the base station 106. The base station 106 may transmit the group communication 120 on a Downlink (DL) channel. For example, the base station 106 may transmit the group communication 120 on a PDSCH. In some instances, the UE-1 102 may also receive a unicast communication 130 from the base station 106. The base station 106 may also transmit the unicast communication 130 on a PDSCH. In some implementations, the UE-1 102 may determine first HARQ information that corresponds to the group communication 120 and transmit the first HARQ information. For example, the UE-1 102 may transmit the first HARQ information based on a UE specific index, or more generally UE specific information. In some implementations, the UE-1 102 may determine second HARQ information that corresponds to the unicast communication 130 and transmit the second HARQ information. HARQ information can be coded or un-coded information relating to the communication. For example, HARQ information can be a coded representation of acknowledgement/negative acknowledgement information. In some implementations, HARQ information can include information for multiple transmission layers. In some implementations, the UE-1 102 may transmit the first HARQ information and the second HARQ information together. FIG. 2-4 and associated descriptions provide additional details of these implementations.

In some instances, the UE-1 102 may determine a group CSI for the group communication 120 and transmit the group CSI. The UE-1 102 may also determine a unicast CSI for the unicast communication 130 and transmit the unicast CSI. In some implementations, the base station may use a first transmission mode to transmit the group communication 120 and a second transmission mode to transmit the unicast communication 130. The group CSI may correspond to the first transmission mode and the unicast CSI may correspond to the second transmission mode. In some implementations, the first transmission mode is different than the second transmission mode. FIG. 5 and associated descriptions provide additional details of these implementations.

Turing to a general description of the elements, a UE may be referred to as mobile electronic device, user device, mobile station, subscriber station, portable electronic device, mobile communications device, wireless modem, or wireless terminal. Examples of a UE (e.g., the UE-1 102 or the UE-2 104) may include a cellular phone, personal data assistant (PDA), smart phone, laptop, tablet personal computer (PC), pager, portable computer, portable gaming device, wearable electronic device, or other mobile communications device having components for communicating voice or data via a mobile communication network.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. A UE may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless network 110 may include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE_Advanced. In some instances, the core networks may be evolved packet cores (EPCs).

A RAN is part of a mobile telecommunication system which implements a radio access technology, such as UMTS, CDMA2000, 3GPP LTE, and 3GPP LTE-A. In many applications, a RAN includes at least one base station 106. A base station 106 may be a NodeB, an evolved NodeB (eNB), or an access point. A base station (e.g., the base station 106) may be a radio base station that may control all or at least some radio related functions in a fixed part of the system. The base station 106 may provide radio interface within their coverage area or a cell for the UE-1 102 and the UE-2 104 to communicate. Base stations 106 may be distributed throughout the cellular network to provide a wide area of coverage. The base station 106 directly communicates to one or a plurality of UEs, other base stations, and one or more core network nodes.

While described in terms of FIG. 1, the present disclosure is not limited to such an environment. In general, mobile communication systems may be described as cellular networks made up of a number of radio cells, or cells that are each served by a base station or other fixed transceiver. The cells are used to cover different areas in order to provide radio coverage over an area. Example mobile communication systems include Global System for Mobile Communication (GSM) protocols, Universal Mobile Telecommunications System (UMTS), 3GPP Long Term Evolution (LTE), and others. In addition to mobile communication systems, wireless broadband communication systems may also be suitable for the various implementations described in the present disclosure. Example wireless broadband communication system includes IEEE 802.11 wireless local area network, IEEE 802.16 WiMAX network, etc.

FIG. 2 is an example PUCCH resource configuration 200 for a group communication service. The example PUCCH resource configuration 200 includes one or more PUCCH resources 202 for Semi-Persistent-Scheduling (SPS) ACK/NACK and Scheduling Request (SR), one or more PUCCH resources 204 for dynamic ACK/NACK for unicast PDSCH and group communication for user ID 0, one or more PUCCH resources 206 for user ID>0 in the first group, and one more PUCCH resources 208 for user ID>0 in the second group.

In a mobile communication system, a UE may transmit HARQ information on a PUCCH resource. For example, if a UE receives a unicast communication on PDSCH in subframe n−4, the UE may use PUCCH Format 1a/1b resource $n_{PUCCH}^{(1)}$ to transmit a HARQ information corresponding to the unicast communication in subframe n, where for a PDSCH transmission indicated by the detection of a corresponding Physical Downlink Control Channel (PDCCH) in subframe n−4 (i.e., PDSCH is dynamically scheduled by PDCCH), the UE may use $n_{PUCCH}^{(1)}=n_{CCE}+N_{PUCCH}^{(1)}$, where $n_{CCE}$ is the number of the first CCE used for transmission of the corresponding downlink control information (DCI) assignment and $N_{PUCCH}^{(1)}$ is configured by higher layers.

for a PDSCH transmission where there is not a corresponding PDCCH detected in subframe n−4 (i.e., PDSCH is scheduled by SPS), the UE may use $n_{PUCCH}^{(1)}=n_{PUCCH,HighLayer}^{(1)}$, where $n_{PUCCH,HighLayer}^{(1)}$ is determined according to higher layer configuration.

In the illustrated example, the UE may use the PUCCH resources 202 to transmit HARQ information corresponding to a unicast communication that is scheduled by SPS. The UE may also use the PUCCH resources 204 to transmit HARQ information corresponding to a unicast communication that is scheduled dynamically.

As described previously, to efficiently use the radio resource, a UE may transmit HARQ information corresponding to a group communication. For example, the UE may receive a group communication on PDSCH in subframe n−4. A group-RNTI may be used to indicate a target group of the group communication. The UE may determine HARQ information that corresponds to the group communication and transmit the HARQ information. For example, the UE may transmit an ACK if the UE correctly receives the group communication and transmit a NACK if the UE does not receive the group communication correctly. The UE may use PUCCH Format 1a/1b to transmit the HARQ information.

To avoid or otherwise reduce collisions of HARQ information transmitted from multiple UEs in the same group, the UE may transmit the HARQ information based on a UE specific index or more generally UE specific information. For example, if the group communication is dynamically scheduled, the UE may determine the PUCCH resource used to transmit HARQ information based on the first CCE index of the DL grant associated with the group communication and a UE specific index within the group. As another example, the UE may determine the PUCCH resource used to transmit HARQ information based on a UE specific index within the group and the group ID. A base station may support multiple group communications in a cell. To separate the PUCCH resources for different groups, the base station may configure an offset value $\Delta_{group}$ for each group. For example, the UE may use the following formula to determine the PUCCH resource for HARQ information corresponding to a group communication, $$n_{PUCCH}^{(1,\tilde{p}_0)} = \begin{cases} n_{CCE} + N_{PUCCH}^{(1)}, & \text{for } u_{id} = 0 \\ N_{PUCCH}^{(1)} + \Delta_{group} + u_{id}, & \text{for } u_{id} > 0 \end{cases}$$

where $n_{CCE}$ is the number of the first CCE of the DL grant, $N_{PUCCH}^{(1)}$ is the number of resources reserved for SPS ACK/NACK and SR, and $\Delta_{group}$ is the offset value associated with a group.

In the illustrated example, if a UE has a UE specific index $u_{id}$ that is 0, the UE may use the PUCCH resource 204 to transmit the HARQ information corresponding to a group communication. If the UE is in a first group and has a UE specific index $u_{id}$ that is greater than 0, the UE may use PUCCH resource 206 to transmit the HARQ information corresponding to a group communication. The UE may determine the PUCCH resource 206 based on $\Delta_{group}$ value for the first group and $u_{id}$. If the UE is in a second group and has a $u_{id}$ that is greater than 0, the UE may use PUCCH resource 208 to transmit the HARQ information corresponding to a group communication. The UE may determine PUCCH resource 208 based on $\Delta_{group}$ value for the second group and $u_{id}$. The base station may transmit an indication of a $\Delta_{group}$ value for a group in an RRC message. The RRC message may be a dedicated message or a broadcast message.

The base station may transmit an indication of the UE specific index $u_{id}$ in a RRC message. The RRC message may be a dedicated message or a broadcast message. Alternatively or in combination, the UE may derive the UE specific index. For example, the UE may derive the UE specific index based on an identity that is associated with the UE. The identity may be a Radio Network Temporary Identity (RNTI), a Temporary Mobile Subscriber Identity (TMSI), or an International Mobile Subscriber Identity (IMSI).

The base station may also configure a specific resource offset for each group in order to transmit HARQ information. The offset information could be signaled in an RRC message. In some implementations, the UE in a group may derive the group offset based on the group ID assigned by the eNB.

In some implementations, a base station may configure a group communication by SPS and, may transmit a group communication without associated DL grant. The base station may use RRC messages to signal the PUCCH resource that the UE may use to transmit HARQ information corresponding to the group communication. The base station may signal a set of a set of PUCCH resources and the UE specific index in RRC messages. The base station may also signal the transmit power control (TPC) field of PDCCH for SPS activation to indicate the PUCCH resource that a UE may use to transmit HARQ information corresponding to the group communication.

FIG. 3 is a schematic 300 illustrating an example transmission of HARQ information for a group communication service. In the illustrated example, a base station transmits a DL packet 302. The DL packet 302 is a group communication that is targeted to a group of UEs. The group of UEs includes UE1, UE2, and UE3. UE1 receives the DL packet 302 and transmits a HARQ information 304a corresponding to the DL packet 302. The HARQ information 304a may be an ACK or a NACK. In the illustrated example, UE1 transmits the HARQ information 304a on a PUCCH resource based on UE1's UE specific index and/or group specific offset. Similarly, UE2 and UE3 receive the DL packet 302 and transmit HARQ information 304b and 304c, respectively. Because UE1, UE2, and UE3 have different UE specific indices, they may use different PUCCH resources to transmit the HARQ information 304a-c to avoid collisions.

FIG. 4 is an example PUCCH payload 400. In some implementations, the example PUCCH payload 400 may include a first HARQ information for a group communication and a second HARQ information for a unicast communication. For example, if a UE is configured with both a unicast communication service and a group communication service, the UE may receive a group communication and a unicast communication in the same subframe. In some implementations, the UE may combine HARQ information corresponding to the unicast and the group communication and transmit the combined HARQ information on one PUCCH resource or one PUSCH resource. This approach may reduce Peak-to-Average Power Ratio (PAPR) of the uplink (UL) transmission. This approach may further improve coverage and save battery life.

In some implementations, a mobile communication system may support Carrier Aggregation (CA). CA enables multiple component carriers (CCs), which may use up to 20 MHz bandwidth each, to be aggregated to form a wider total bandwidth. To support CA, a UE may simultaneously receive or transmit on one or multiple CCs. These multiple CCs may be from the same base station or from different base station. In a Frequency Division Duplex (FDD) system, the number of CCs aggregated in the DL may be different from the CCs in the UL and the bandwidths configured for the UL may also be different from the bandwidths for the DL.

For CA, a UE may have one Radio Resource Control (RRC) connection with the network. The serving cell handling RRC connection establishment/re-establishment/handover is referred to as the Primary Cell (PCell). The carrier corresponding to the PCell is termed the primary component carrier (PCC). Other serving cells are referred to as secondary cells (SCells) and their corresponding carriers are referred to as secondary component carriers (SCC). The carriers could be aggregated intra-band and/or inter-band. A UE may have one independent HARQ entity per CC and in each of uplink or downlink.

In some implementations, a base station may configure a CA based unicast communication for a UE. The base station may configure the UE to use PUCCH format 3 to transmit the first HARQ information and the second HARQ information. In the illustrated example, the UE may use a bit 402 to transmit the first HARQ information. If the first HARQ information includes more than one layer, the UE may also use a bit 404 to transmit the first HARQ information. Similarly, the UE may use a bit 412 and a bit 414 to transmit the second HARQ information. The base station may configure the PUCCH resource for PUCCH format 3 by higher layers such as RRC.

In some implementations, a base station may configure a unicast communication that is not CA based. A base station may configure one or more PUCCH format 3 resources for the UE to transmit the first HARQ information and the second HARQ information. In some subframes, the UE may receive a unicast communication without a group communication. The UE may use PUCCH format 1a/1b to transmit HARQ information corresponding to the unicast communication. The UE may transmit the HARQ information on a PUCCH resource based on the DL grant associated with the unicast communication. In some subframes, the UE may receive both a unicast communication and a group communication in the same subframe. The UE may use PUCCH format 3 to transmit the first HARQ information corresponding to the group communication and the second HARQ information corresponding to the unicast communication.

Alternatively or in combination, when a base station configures a unicast communication that is not CA based, the UE may also use PUCCH format 1b with channel selection to transmit the first HARQ information and the second HARQ information. For example, when the UE receives both a unicast communication and a group communication in the same subframe, the UE may determine a PUCCH resource based partly on the first CCE index of the DL grant associated with the unicast communication, and partly on RRC messages transmitted by the base station. For example, the base station may configure multiple PUCCH resources and signal a PUCCH resource to use in a TPC filed in the DL grant associated with the unicast communication.

In some instances, the specifications for the radio access technology may include descriptions to support transmission of HARQ information for group communication services. Following is an example portion of TS 36.213 specification for LTE/LTE_A that may support the transmission of HARQ information for group communication services using this approach:

10.1.2.1 FDD HARQ-ACK Procedure for one Configured Serving Cell

HARQ-ACK transmission on two antenna ports ($p \in [p_0, p_1]$) is supported for PUCCH format 1a/1b.

For FDD and one configured serving cell, the UE shall use PUCCH resource $n_{PUCCH}^{(1,\tilde{p})}$ for transmission of HARQ-ACK in subframe n for $\tilde{p}$ mapped to antenna port p for PUCCH format 1a/1b [3], where for a non-group call UE, for a PDSCH transmission indicated by the detection of a corresponding PDCCH in subframe n−4, or for a PDCCH indicating downlink SPS release (defined in subclause 9.2) in subframe n−4, the UE shall use $n_{PUCCH}^{(1,\tilde{p}_0)} = n_{CCE} + N_{PUCCH}^{(1)}$ for antenna port $p_0$, where $n_{CCE}$ is the number of the first CCE (i.e. lowest CCE index used to construct the PDCCH) used for transmission of the corresponding DCI assignment and $N_{PUCCH}^{(1)}$ is configured by higher layers. For two antenna port transmission the PUCCH resource for antenna port $p_1$ is given by $n_{PUCCH}^{(1,\tilde{p}_1)} = n_{CCE} + 1 + N_{PUCCH}^{(1)}$. For a group call UE, the UE shall use $n_{PUCCH}^{(1,\tilde{p}_0)} = N_{PUCCH}^{(1)} + \Delta_{group} + u_{id}$ for antenna port $p_0$, $\Delta_{group}$ is the offset value associated with a group, and $u_{id}$ is the UE index inside the group.

for a PDSCH transmission on the primary cell where there is not a corresponding PDCCH/EPDCCH detected in subframe n−4, the value of $n_{PUCCH}^{(1,\tilde{p})}$ is determined according to higher layer configuration and Table 9.2-2. For a UE configured for two antenna port transmission, a PUCCH resource value in Table 9.2-2 maps to two PUCCH resources with the first PUCCH resource $n_{PUCCH}^{(1,\tilde{p}_0)}$ for antenna port $p_0$ and the second PUCCH resource $n_{PUCCH}^{(1,\tilde{p}_1)}$ for antenna port $p_1$, otherwise, the PUCCH resource value maps to a single PUCCH resource $n_{PUCCH}^{(1,\tilde{p}_0)}$ for antenna port $p_0$.

10.1.2.2 FDD HARQ-ACK Procedures for More than One Configured Serving Cell

The FDD HARQ-ACK feedback procedures for more than one configured serving cell are either based on a PUCCH format 1b with channel selection HARQ-ACK procedure as described in subclause 10.1.2.2.1 or a PUCCH format 3 HARQ-ACK procedure as described in subclause 10.1.2.2.2.

HARQ-ACK transmission on two antenna ports ($p \in [p_0, p_1]$) is supported for PUCCH format 3.

HARQ-ACK transmission on two antenna ports ($p \in [p_0, p_1]$) is supported for PUCCH format 1b with channel selection and FDD with two configured serving cells.

10.1.2.2.1 PUCCH format 1b with Channel Selection HARQ-ACK Procedure

A UE configured with a transmission mode that supports up to two transport blocks on serving cell, c, shall use the same HARQ-ACK response for both the transport blocks in response to a PDSCH transmission with a single transport block or a PDCCH/EPDCCH indicating downlink SPS release associated with the serving cell c.

TABLE 10.1.2.2.1-1

Mapping of Transport Block and Serving Cell to HARQ-ACK (j) for PUCCH format 1b HARQ-ACK channel selection

| A | HARQ-ACK(0) | HARQ-ACK(1) | HARQ-ACK(2) | HARQ-ACK(3) |
|---|---|---|---|---|
| 2 | TB1 Primary cell | TB1 Secondary cell | NA | NA |
| 3 | TB1 Serving cell1 | TB2 Serving cell1 | TB1 Serving cell2 | NA |
| 4 | TB1 Primary cell | TB2 Primary cell | TB1 Secondary cell | TB2 Secondary cell |

The UE shall determine the A PUCCH resources, $n_{PUCCH,j}^{(1)}$ associated with HARQ-ACK(j) where $0 \leq j \leq A-1$ in Table 10.1.2.2.1-1, according to for a non-group call UE, for a PDSCH transmission indicated by the detection of a corresponding PDCCH in subframe n−4 on the primary cell, or for a PDCCH indicating downlink SPS release (defined in subclause 9.2) in subframe n−4 on the primary cell, the PUCCH resource is $n_{PUCCH,j}^{(1)} = n_{CCE} + N_{PUCCH}^{(1)}$, and for transmission mode that supports up to two transport blocks, the PUCCH resource $n_{PUCCH,j+1}^{(1)}$ is given by $n_{PUCCH,j+1}^{(1)} = n_{CCE} + 1 + N_{PUCCH}^{(1)}$ where $n_{CCE}$ is the number of the first CCE used for transmission of the corresponding PDCCH and $N_{PUCCH}^{(1)}$ is configured by higher layers. For a group call UE, the UE shall use $n_{PUCCH}^{(1,\tilde{p}_0)} = N_{PUCCH}^{(1)} + \Delta_{group} + u_{id}$ for antenna port $p_0$, $\Delta_{group}$ is the offset value associated with a group, and $u_{id}$ is the UE index inside the group.

FIG. 5 is a schematic 500 illustrating an example transmission of CSI for a group communication service. In some implementations, a base station may configure a UE with both a unicast communication service and a group communication service. The base station may transmit a group communication on a PDSCH to the UE. The base station may also transmit a unicast communication on the PDSCH to the UE. The base station may transmit the unicast communication and the group communication in the same or different subframe.

In the illustrated example, at step 510, a base station 502 configures a CSI report for a UE 504. A CSI may include a CQI, a PMI, a PTI, and/or a RI. The base station may use a received CSI to determine an optimal transmission format to transmit a packet to the UE. The optimal transmission format may include information that represents an optimal number of antennas, an optimal modulation and coding scheme, and/or an optimal effective coding rate. The base station may configure the UE to transmit the CSI periodically and/or aperiodically. In some implementations, the base station may configure CSI reporting using RRC signaling. For example, the base station may configure the PUCCH resource that a UE may use to transmit CSI by a RRC message. In some implementations, the base station may configure CSI reporting using information elements (IEs). For example, the base station may configure CQI reports for a UE using CQI-ReportConfig IE. The CQI report configuration may configure periodicity and subframe offset of the CQI report. In the illustrated example, the base station 502 configures a CQI report for a group communication and a CQI report for a unicast communication for the UE 504. Following is an example CQI-ReportConfig Information Element (IE) that may configure a CQI report for a group communication.

CQI-ReportConfig Information Elements

```
-- ASN1START
CQI-ReportConfig ::=            SEQUENCE {
    cqi-ReportModeAperiodic         CQI-ReportModeAperiodic OPTIONAL,     -- Need OR
    nomPDSCH-RS-EPRE-Offset             INTEGER (-1..6),
    cqi-ReportPeriodic              CQI-ReportPeriodic OPTIONAL           -- Need ON
}
CQI-ReportConfig-v920 ::=       SEQUENCE {
    cqi-Mask-r9                     ENUMERATED {setup}          OPTIONAL,    --
Cond cqi-Setup
    pmi-RI-Report-r9                ENUMERATED {setup}          OPTIONAL     --
Cond PMIRI
}
CQI-ReportConfig-r10 ::= SEQUENCE {
    cqi-ReportAperiodic-r10         CQI-ReportAperiodic-r10
    OPTIONAL,            -- Need ON
    nomPDSCH-RS-EPRE-Offset     INTEGER (-1..6),
    cqi-ReportPeriodic-r10          CQI-ReportPeriodic-r10
    OPTIONAL,            -- Need ON
    pmi-RI-Report-r9                ENUMERATED {setup}
    OPTIONAL,            -- Cond PMIRIPCell
```

```
    csi-SubframePatternConfig-r10                      CHOICE {
        release                                             NULL,
        setup                                               SEQUENCE {
            csi-MeasSubframeSet1-r10                            MeasSubframePattern-r10,
            csi-MeasSubframeSet2-r10                            MeasSubframePattern-r10
        }
    }
    OPTIONAL            -- Need ON
}
CQI-ReportConfig-v1130 ::=              SEQUENCE {
    cqi-ReportPeriodic-v1130                            CQI-ReportPeriodic-v1130,
    cqi-ReportBoth-r11                                  CQI-ReportBoth-r11
}
CQI-ReportConfigSCell-r10 ::=                           SEQUENCE {
    cqi-ReportModeAperiodic-r10                         CQI-ReportModeAperiodic OPTIONAL,          -- Need OR
    nomPDSCH-RS-EPRE-Offset-r10                         INTEGER (-1..6),
    cqi-ReportPeriodicSCell-r10                         CQI-ReportPeriodic-r10
    OPTIONAL,           -- Need ON
    pmi-RI-Report-r10                                   ENUMERATED {setup}
    OPTIONAL            -- Cond PMIRISCell
}
CQI-ReportConfig-v13 ::= SEQUENCE {
    cqi-ReportPeriodic-v13                          CQI-ReportPeriodic-v13,
}
CQI-ReportPeriodic ::=                  CHOICE {
    release                                             NULL,
    setup                                               SEQUENCE {
        cqi-PUCCH-ResourceIndex                             INTEGER (0..1185),
        cqi-pmi-ConfigIndex                                 INTEGER (0..1023),
        cqi-FormatIndicatorPeriodic                         CHOICE {
            widebandCQI                                         NULL,
            subbandCQI                                          SEQUENCE {
                k                                                   INTEGER (1..4)
            }
        },
        ri-ConfigIndex                                  INTEGER (0..1023)       OPTIONAL,   --
Need OR
        simultaneousAckNackAndCQI                       BOOLEAN
    }
}
CQI-ReportPeriodic-r10 ::=                  CHOICE {
    release                                             NULL,
    setup                                               SEQUENCE {
        cqi-PUCCH-ResourceIndex-r10                         INTEGER (0..1184),
        cqi-PUCCH-ResourceIndexP1-r10                       INTEGER (0..1184)
        OPTIONAL,       -- Need OR
        cqi-pmi-ConfigIndex                             INTEGER (0..1023),
        cqi-FormatIndicatorPeriodic-r10                     CHOICE {
            widebandCQI-r10                                     SEQUENCE {
                csi-ReportMode-r10                          ENUMERATED {submode1, submode2}
            OPTIONAL            -- Need OR
            },
            subbandCQI-r10                                      SEQUENCE {
                k                                                   INTEGER (1..4),
                periodicityFactor-r10                               ENUMERATED {n2, n4}
            }
        },
        ri-ConfigIndex                                  INTEGER (0..1023)       OPTIONAL,   --
Need OR
        simultaneousAckNackAndCQI                       BOOLEAN,
        cqi-Mask-r9                                     ENUMERATED {setup}      OPTIONAL,   --
Need OR
        csi-ConfigIndex-r10                             CHOICE {
            release                                             NULL,
            setup                                               SEQUENCE {
                cqi-pmi-ConfigIndex2-r10                            INTEGER (0..1023),
                ri-ConfigIndex2-r10                                 INTEGER (0..1023)
            OPTIONAL            -- Need OR
            }
        }                   OPTIONAL                                                        --
Need ON
    }
}
CQI-ReportPeriodic-r13 ::=              CHOICE {
    release                                             NULL,
    setup                                               SEQUENCE {
        cqi-PUCCH-ResourceIndex-r10                         INTEGER (0..1184),
        cqi-PUCCH-ResourceIndexP1-r10                       INTEGER (0..1184)
```

-continued

```
    OPTIONAL,            -- Need OR
        cqi-pmi-ConfigIndex                     INTEGER (0..1023),
        cqi-FormatIndicatorPeriodic-r10             CHOICE {
            widebandCQI-r10                         SEQUENCE {
                    csi-ReportMode-r10              ENUMERATED {submode1, submode2}
    OPTIONAL               -- Need OR
            },
            subbandCQI-r10                          SEQUENCE {
                k                                   INTEGER (1..4),
                    periodicityFactor-r10               ENUMERATED {n2, n4}
            }
        },
        ri-ConfigIndex                          INTEGER (0..1023)        OPTIONAL, --
Need OR
        simultaneousAckNackAndCQI               BOOLEAN,
        cqi-Mask-r9                             ENUMERATED {setup}       OPTIONAL, --
Need OR
        csi-ConfigIndex-r10                     CHOICE {
            release                                 NULL,
            setup                                   SEQUENCE {
                    cqi-pmi-ConfigIndex2-r10            INTEGER (0..1023),
                    ri-ConfigIndex2-r10                 INTEGER (0..1023)
    OPTIONAL                -- Need OR
            }
        }                        OPTIONAL
        csi-ConfigIndex-groupcomm-r13           CHOICE {
            release                                 NULL,
            setup                                   SEQUENCE {
                    cqi-pmi-ConfigIndex-groupcomm-r13   INTEGER (0..1023),
                    ri-ConfigIndex-groupcomm-r13        INTEGER (0..1023)
    OPTIONAL                -- Need OR
            }
        }                        OPTIONAL                                            --
Need ON
    }
}
```

At step 512, the UE may determine a group CSI for the group communication and a unicast CSI for the unicast communication. A UE may determine a CSI based on the channel condition that the UE experiences. The UE may further determine a CSI based on the configured transmission mode (TM). The transmission mode may be one of open-loop transmission modes or one of closed-loop transmission modes. A group CSI may be different than a unicast CSI because a base station may use different transmission modes for the group communication and the unicast communication. In some implementations, a base station may use an open-loop transmission mode for the group communication. For example, the base station may use single antenna transmission, transmit diversity, or open-loop spatial multiplexing. In some implementations, a base station may use a closed-loop transmission mode for the unicast communication. For example, the base station may use closed-loop spatial multiplexing. The base station may use RRC signaling to indicate the transmission modes to the UE. The base station may indicate the transmission mode when a Data Radio Bearer (DRB) is established. In the illustrated example, the UE determines the group CSI and the unicast CSI by performing CQI measurements on the unicast bearer and the group commination bearer, respectively.

At step 514, the UE may transmit the unicast CSI for the unicast communication. The UE may transmit the unicast CSI on a PUCCH resource that is configured by a RRC message. In the illustrated example, the UE transmits a CQI reporting for the unicast bearer.

At step 516, the UE may transmit the group CSI for the group communication. The UE may transmit the group CSI on a PUCCH resource that is configured by a RRC message. In the illustrated example, the UE transmits a CQI reporting for the group communication bearer. In some implementations, the UE may transmit the unicast CSI and the group CSI together.

In some instances, the specifications for the radio access technology may include descriptions to support transmission of a group CSI for group communication services. Following is an example portion of TS 36.213 specification for LTE/LTE_A that may support transmission of group CSI for group communication services using this approach:

7.2 UE Procedure for Reporting Channel State Information (CSI)

The time and frequency resources that can be used by the UE to report CSI which consists of Channel Quality Indicator (CQI), precoding matrix indicator (PMI), precoding type indicator (PTI), and/or rank indication (RI) are controlled by the eNB. For spatial multiplexing, as given in [3], the UE shall determine a RI corresponding to the number of useful transmission layers. For transmit diversity as given in [3], RI is equal to one.

A UE in transmission mode 8 or 9 is configured with or without PMI/RI reporting by the higher layer parameter pmi-RI-Report.

A UE in transmission mode 10 can be configured with one or more CSI processes per serving cell by higher layers. Each CSI process is associated with a CSI-RS resource (defined in subclause 7.2.5) and a CSI-interference measurement (CSI-IM) resource (defined in subclause 7.2.6). A CSI reported by the UE corresponds to a CSI process configured by higher layers. Each CSI process can be configured with or without PMI/RI reporting by higher layer signalling.

A UE is configured with resource-restricted CSI measurements if the subframe sets $C_{CSI,0}$ and $C_{CSI,1}$ are configured by higher layers.

CSI reporting is periodic or aperiodic.

If the UE is configured with more than one serving cell, it transmits CSI for activated serving cell(s) only.

If a UE is not configured for simultaneous PUSCH and PUCCH transmission, it shall transmit periodic CSI reporting on PUCCH as defined hereafter in subframes with no PUSCH allocation.

If a UE is not configured for simultaneous PUSCH and PUCCH transmission, it shall transmit periodic CSI reporting on PUSCH of the serving cell with smallest ServCellIndex as defined hereafter in subframes with a PUSCH allocation, where the UE shall use the same PUCCH-based periodic CSI reporting format on PUSCH.

A UE shall transmit aperiodic CSI reporting on PUSCH if the conditions specified hereafter are met. For aperiodic CQI/PMI reporting, RI reporting is transmitted only if the configured CSI feedback type supports RI reporting.

For a group call UE, a UE shall report the periodic CSI feedback for both the unicast bearer and the group call bearer in accordance with the high layer configurations. A UE shall report the aperiodic CSI feedback for both the unicast bearer and the group call bearer in accordance with the high layer configurations.

FIG. 6 is a flowchart 600 showing an illustrative method for transmitting HARQ information for a group communication service. The flowchart begins at step 602 where a UE receives a group communication on a PDSCH from a base station. At step 604, the UE may determine a first HARQ information that corresponds to the group communication on the PDSCH.

In some implementations, at step 610, the UE may transmit the first HARQ information. In some implementations, the UE may transmit the first HARQ information based on a UE specific index and/or group specific offset. For example, the UE may transmit the first HARQ information on a PUCCH resource that is based on the UE specific index and/or group specific offset. In some implementations, the UE may transmit the first HARQ information based on both the UE specific index and a Downlink (DL) grant that is associated with the group communication on the PDSCH. In some implementations, the UE receives an indication of the UE specific index in a Radio Resource Control (RRC) message. Alternatively or in combination, the UE may derive the UE specific index based on an identity that is associated with the UE. The identity may be a Radio Network Temporary Identity (RNTI), a Temporary Mobile Subscriber Identity (TMSI), or an International Mobile Subscriber Identity (IMSI).

In some implementations, at step 620, the UE may receive a unicast communication on the PDSCH from the base station. At step 622, the UE may determine a second HARQ information that corresponds to the unicast communication on the PDSCH.

At step 624, the UE may transmit the first HARQ information and the second HARQ information. In some implementations, the UE may transmit the first HARQ information and the second HARQ information together. For example, the UE may use PUCCH format 3 to transmit the first HARQ information and the second HARQ information. In some implementations, the UE may transmit the first HARQ information and the second HARQ information based on a DL grant that is associated with the unicast communication on the PDSCH. In some implementations, the UE may transmit the first HARQ information and the second HARQ information on a PUCCH resource that is configured by a RRC message.

FIG. 7 is a flowchart 700 showing an illustrative method for transmitting CSI for a group communication service. The flowchart begins at step 702 where a UE determines a group CSI for a group communication. The group communication may be transmitted on a PDSCH. At step 704, the UE may determine a unicast CSI for a unicast communication that is transmitted by the base station on the PDSCH. In some implementations, the group CSI corresponds to a first transmission mode and the unicast CSI corresponds to a second transmission mode. In some implementations, the first transmission mode is different than the second transmission mode. The group CSI may include one or more CQIs, one or more PMIs, one or more PTSs, and/or one or more RIs.

At step 706, the UE may transmit the group CSI. In some implementations, the UE may transmit the group CSI on a PUCCH resource that is configured by a RRC message. At step 708, the UE may transmit the unicast CSI. In some implementations, the UE may transmit the unicast CSI on a PUCCH resource that is configured by a RRC message.

In some implementations, a method includes receiving, from a base station, a group communication on a Physical Downlink Shared Channel (PDSCH). First Hybrid Automatic Repeat reQuest (HARQ) information that corresponds to the group communication on the PDSCH is determined. The first HARQ information is transmitted.

In some implementations, an apparatus comprises instructions embodied on a tangible, non-transitory computer-readable medium. The instructions operable when executed to cause a computing system to perform operations comprising: receiving, from a base station, a group communication on a Physical Downlink Shared Channel (PDSCH); determining a first Hybrid Automatic Repeat reQuest (HARQ) information that corresponds to the group communication on the PDSCH; and transmitting the first HARQ information.

In some implementations, an apparatus comprises instructions embodied on a tangible, non-transitory computer-readable medium. The instructions operable when executed to cause a computing system to perform operations comprising: determining a group Channel State Information (CSI) for a group communication, wherein the group communication is transmitted by a base station on a PDSCH; determining a unicast CSI for a unicast communication, wherein the unicast communication is transmitted by the base station on the PDSCH; transmitting the group CSI; and transmitting the unicast CSI.

A number of embodiments of the invention have been described. Nevertheless, it will be understood that various modifications may be made without departing from the spirit and scope of the invention. Accordingly, other embodiments are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing form the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps are not implied by the order they appear in the claims.

What is claimed is:

1. A method for mobile communication system comprising:
   receiving, at a user equipment (UE), a group offset value associated with a group of UEs, wherein the UE is included in the group of UEs;
   receiving, from a base station, a group communication on a Physical Downlink Shared Channel (PDSCH), wherein the group communication comprises a data packet addressed to a plurality of UEs in the group of UEs;
      determining, by the UE and based on whether the data packet addressed to the plurality of UEs is received, a first Hybrid Automatic Repeat reQuest (HARQ) information that corresponds to the group communication on the PDSCH;
   receiving, from the base station, a unicast communication on the PDSCH;
      determining, by the UE a second HARQ information that corresponds to the unicast communication on the PDSCH; and
   transmitting, from the UE, the first HARQ information and the second HARQ information together based on a Downlink (DL) grant that is associated with the unicast communication on the PDSCH.

2. The method of claim 1, wherein the first HARQ information and the second HARQ information are transmitted together using Physical Uplink Control Channel (PUCCH) format 3.

3. A user equipment (UE), comprising:
   a receiver that receives, from a base station, a group offset value associated with a group of UEs, wherein the UE is included in the group of UEs, the receiver further receiving a group communication and a unicast communication on a Physical Downlink Shared Channel (PDSCH), wherein the group communication comprises a data packet addressed to a plurality of UEs in the group of UEs;
   one or more processors configured to:
      determine, based on whether the data packet addressed to the plurality of UEs is received, a first Hybrid Automatic Repeat reQuest (HARQ) information that corresponds to the group communication on the PDSCH;
      determine a second HARQ information that corresponds to the unicast communication on the PDSCH; and
   a transmitter that transmits the first HARQ information and the second HARQ information together based on a Downlink (DL) grant that is associated with the unicast communication on the PDSCH.

4. A tangible, non-transitory computer-readable medium storing instructions which, when executed by one or more processors, cause a computing system to perform operations comprising:
   receiving, at a user equipment (UE), a group offset value associated with a group of UEs, wherein the UE is included in the group of UEs;
   receiving, from a base station, a group communication on a Physical Downlink Shared Channel (PDSCH), wherein the group communication comprises a data packet addressed to a plurality of UEs in the group of UEs;
   determining, based on whether the data packet addressed to the plurality of UEs is received, a first Hybrid Automatic Repeat reQuest (HARQ) information that corresponds to the group communication on the PDSCH;
   receiving, from the base station, a unicast communication on the PDSCH;
   determining a second HARQ information that corresponds to the unicast communication on the PDSCH; and
   transmitting, from the UE, the first HARQ information and the second HARQ information together based a Downlink (DL) grant that is associated with the unicast communication on the PDSCH.

* * * * *

UNITED STATES PATENT AND TRADEMARK OFFICE
CERTIFICATE OF CORRECTION

PATENT NO.         : 9,973,901 B2
APPLICATION NO.    : 14/229324
DATED              : May 15, 2018
INVENTOR(S)        : Zhijun Cai, Chandra Sekhar Bontu and Yi Song Page 1 of 1

It is certified that error appears in the above-identified patent and that said Letters Patent is hereby corrected as shown below:

In Column 17, Line 21, In Claim 1, delete "system" and insert -- system, --, therefor.

In Column 17, Line 37, In Claim 1, delete "UE" and insert -- UE, --, therefor.

In Column 18, Line 44, In Claim 4, delete "based a" and insert -- based on a --, therefor.

Signed and Sealed this
Thirteenth Day of November, 2018

Andrei Iancu
*Director of the United States Patent and Trademark Office*